United States Patent

Fan

[11] Patent Number: 5,819,802
[45] Date of Patent: Oct. 13, 1998

[54] I-TYPE COUNTERFLOW ABSORBER

[76] Inventor: Jui Hua Fan, 2F, No. 2, Ln. 15, Chiu-Chjung St., LuChou, Taipei, Taiwan

[21] Appl. No.: 928,699

[22] Filed: Sep. 12, 1997

[51] Int. Cl.[6] .................................................. F16L 55/04
[52] U.S. Cl. ................................ 138/31; 138/30; 188/314
[58] Field of Search ............................... 138/31, 30, 26; 220/720, 721; 188/313, 314

[56] References Cited

U.S. PATENT DOCUMENTS

| | | | |
|---|---|---|---|
| 1,932,666 | 10/1933 | Hyatt | 138/31 X |
| 4,000,758 | 1/1977 | Meisenheimer, Jr. | 138/31 |
| 4,997,009 | 3/1991 | Niikura et al. | 138/31 X |
| 5,353,840 | 10/1994 | Paley et al. | 138/31 |

*Primary Examiner*—Patrick F. Brinson
*Attorney, Agent, or Firm*—W. Wayne Liauh

[57] ABSTRACT

An I-type counterflow absorber for directly connecting with a piping system to absorb the impact force and noise resulting from water hammering in the piping system. It includes an outer tube, an inner tube, a valve member and a buffer mechanism. The inner tube forms a water passage with the piping system. The valve member is moveable and covers one end of the inner tube. The buffer mechanism is located between the inner tube and the outer tube, and has a damping chamber and an air chamber for absorbing the impact force and noise resulting from water hammering in the piping system. It can effectively protect the pumping device and piping end from water hammering damage.

5 Claims, 7 Drawing Sheets

I-TYPE COUNTERFLOW ABSORBER

BACKGROUND OF THE INVENTION

1. Field of the Invention

This invention relates to an I-type counterflow absorber and particularly to a counterflow absorber used in a water piping system for avoiding damage of pipe end and pumping unit caused by water hammering and to reduce noise resulting from water turbulence.

2. Description of the Prior Art

It is generally known that in a water piping system a water hammering phenomenon will be taking place when a valve is open or close rapidly intermittent or continuous impact force will be incurred. The valve may be a counterflow valve, a solenoid valve or a floating valve. Besides the opening or closing of a valve, the abrupt start or stop of a pump, or improper piping configuration could also create water hammering effect which tends to damage piping elements and equipment, and will shorten their service life.

There are a great deal of improvements and innovations in the design and structure of contemporary high rise buildings. However little improvement has been made in the piping system built in them. A piping network (such as a water piping system) usually is constructed bottom up. A pumping system is employed to overcome gravity force and to pump water to the top of the building. The power of the pump is almost equal to the water hammering force. When a pump is abruptly stop, water hammer, because of gravity and acceleration, impacts on the pump with great force. It could easily damage the pump to useless. While a conventional counterflow valve or solenoid valve might prevent water from counterflowing, it does not help much in reducing the impact force of water hammering or the noise incurred. Furthermore, water hammering could also create leakage problem and easily results in lack or no water supply in certain areas of a building.

To remedy the problems set forth above, there has been a water hammer absorber being developed and marketed. It generally has a closed end and has its the other end installed at one end of the piping system. To use this absorber, an extra piping branch has to be provided in addition to the original water piping system. It therefore takes more space and adds complexity to the piping system. It also has a closed air chamber. The air pressure of the air chamber is usually fixed and is difficult to measure or adjust. It is hence mostly applicable to a small size or lower pressure piping system. To a high rise building (such as 15 stories or more), or a building with a long vertical pipe line (such as 20 feet or more), the conventional absorber cannot effectively prevent the impact force or noise produced by water hammering. As a result, the pumping unit installed at one end of the piping system, or even the pipe itself, may be damaged.

SUMMARY OF THE INVENTION

It is an object of this invention to provide an I-type counterflow absorber which may be installed directly in a piping system for absorbing water hammering. It dispenses with the branch tube in the piping system and thus reduces the space needed. It has an adjustable air chamber to suit different needs and situations. It may be located in the middle of a water pipe line, and thus is more flexible and easy to configure. It also can provide better protection for the equipment at the end of the piping systems.

It is another object of this invention to provide an I-type counterflow absorber for directly connecting in the pipe line system to absorb the impact force and noise resulting from water hammering.

The I-type counterflow absorber according to this invention includes an outer tube which has a connecting member on each of two ends for fastening with a piping system. Within the outer tube, there is an inner tube fluidly communicating with the piping system. There is a valve means located in the outer tube for open or close the inner tube. A buffer means is provided between the inner tube and the outer tube including a damping chamber and an air chamber for absorbing the impact force resulting from water hammering. There is a water pressure gauge for measuring water pressure in the water passage, and an air pressure gauge for measuring air pressure in the air chamber. The air pressure gauge has a nozzle for discharging or pumping air in the air chamber.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
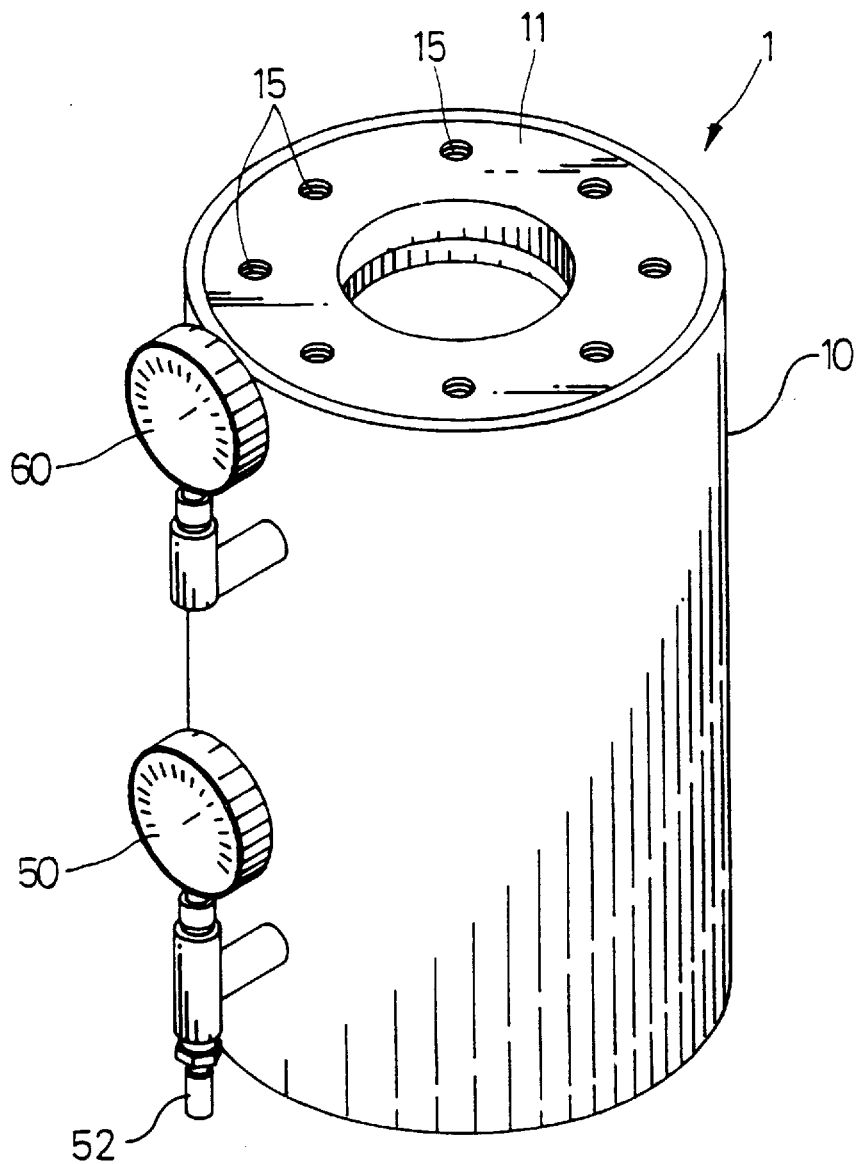
FIG. 1 is a perspective view of this invention.
Figure 2:
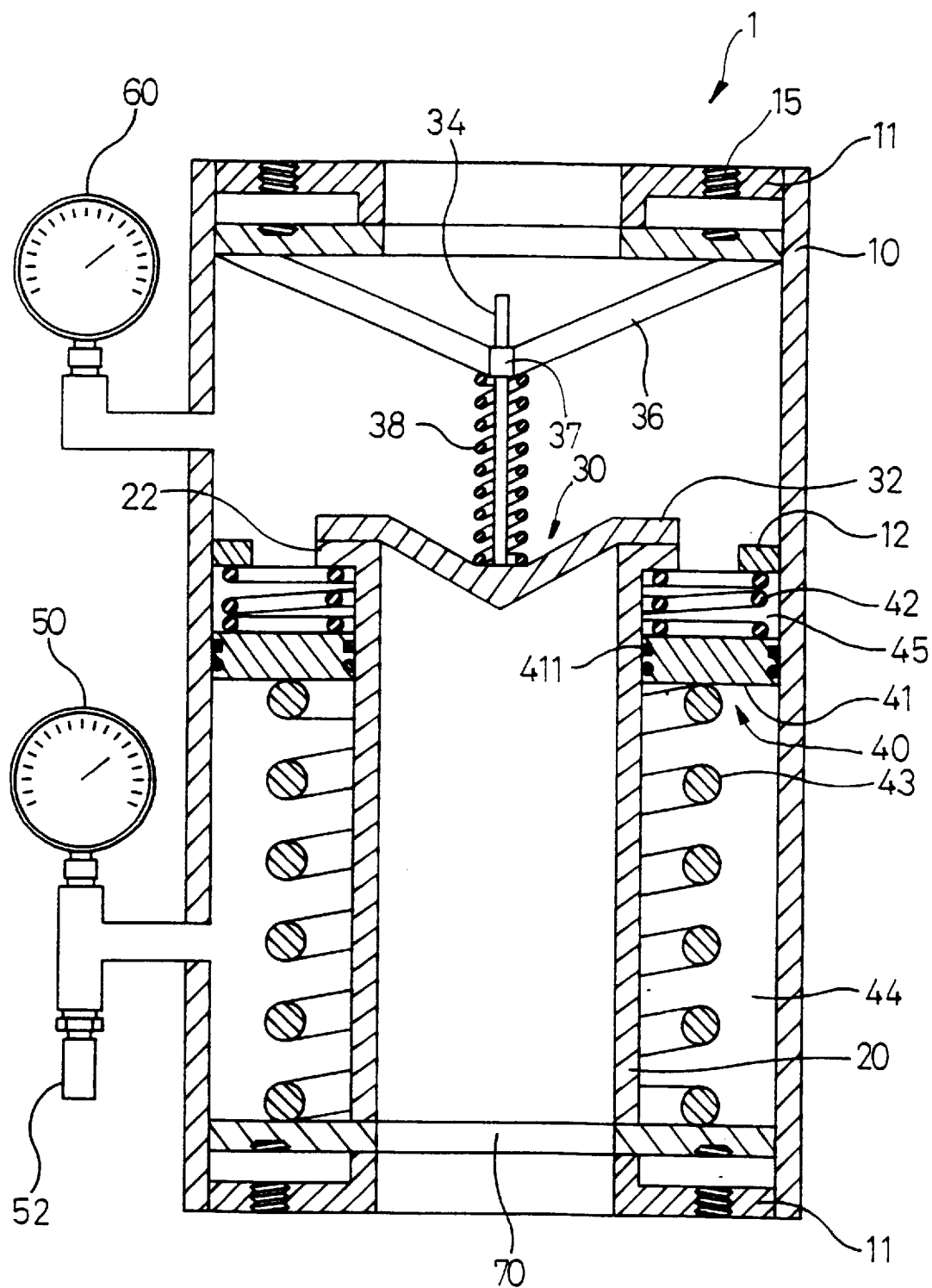
FIG. 2 is a sectional view taken along line 2—2 of FIG. 1.

Referring to FIGS. 1 and 2, the I-type counterflow absorber 1 of this invention includes an outer tube 10, an inner tube 20, a valve means 30 and a buffer means 40. At two ends of the outer tube 10, there is respectively a connecting member 11 which has a plurality of screw openings 15 for fastening directly with a piping system (not shown in the figures) at a location desired. It therefore does not need a fork-shaped tube connected with the piping system to act as a branch pipe as a conventional absorber does.

The inner tube 20 is housed in the outer tube 10 and has a water passage 70 fluidity communicating with the piping system. The valve means 30 is located in the outer tube 10 and is at one end of the inner tube 20. It includes a valve cap 32, a stem 34 movable through a sleeve 37 which is held by a bracket 36 and a first spring 38 which presses the valve cap 32 against one end of the inner tube 20. The bracket 36 has a plurality of arms fixed at one end to the inner wall of the outer tube 10. In the absence of external force, the valve cap 32 is being pressed by the first spring 38 to close the inner tube 20. When a pump (not shown in the figure) at one end of the piping system starts pumping water (preferably from a bottom side in FIG. 2), water pressure pushes the valve cap 32 upward from below and opens the valve cap 32 to enable water flowing upward (as shown in FIG. 3).

The buffer means 40 is located between the inner tube 20 and the outer tube 10. The buffer means 40 includes a damping chamber 45 at a top portion and an air chamber 44 at a lower portion, with a movable piston ring 41 set between them. In the damping chamber 45, there is a second spring 42 located between a first annular flange 22 fixed to the inner tube 20, a second annular flange 12 fixed to the outer tube 10 and the piston ring 41. However, it is rather obvious for any person skilled in the art to produce a damping chamber without the second spring 42 disposed therein. The damping chamber 45 is fluidly communicating with the piping system through a gap between the first flange 22 and the second flange 12. There is a water pressure gauge 60 connecting to the outer tube 10 for measuring water pressure in the piping system.

In the air chamber 44, there is a third spring 43 set between the piston ring 41 and another end of the outer tube 10. Of course, it is also obvious for any person skilled in the art to produce a air chamber without the third spring 43 disposed therein. The piston ring 41 has at least an O-ring 411 respectively on both rims to seal the contact surface with the inner tube 20 and outer tube 10 to avoid air leakage in the air chamber 44. There is an air pressure gauge 50 outside the air chamber 44 for measuring air pressure therein. The air pressure gauge 50 has a nozzle 52 for discharging air or pumping compressed air in the air chamber 44.

Figure 3:
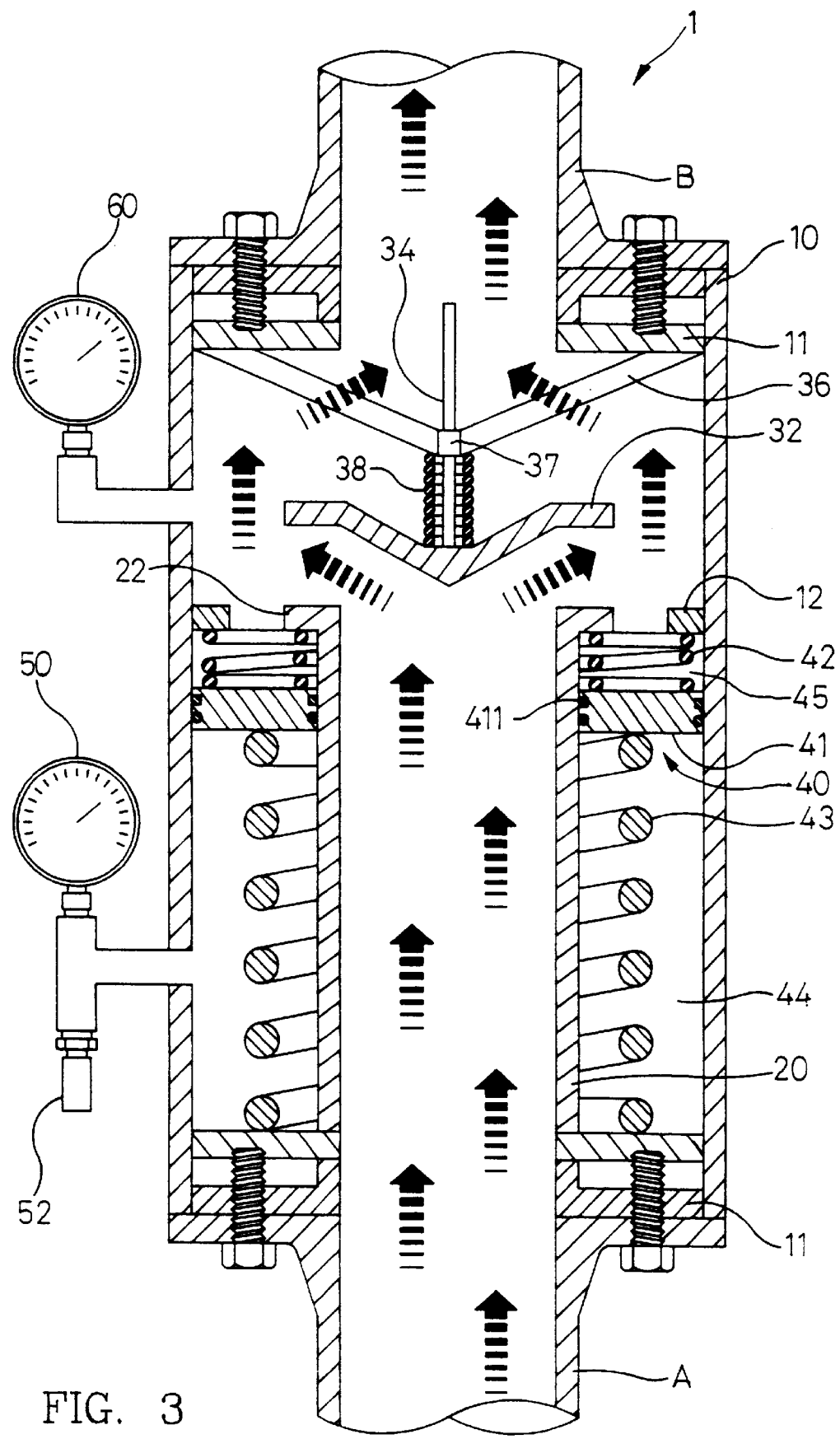
FIG. 3 is a sectional view similar to FIG. 2 in use state (for normal water flow condition).

FIG. 3 shows this invention in use. The I-type counterflow absorber 1 is fastened at both ends with a piping systems at a bottom end "A" and a top end "B". When a pump (not shown) is activated, water flows in the absorber 1 from the bottom end "A" through a passage 70 (shown in FIG. 2), pushes the valve cap 32 upward, and flows out of the absorber 1 through the top end "B".

Figure 4:
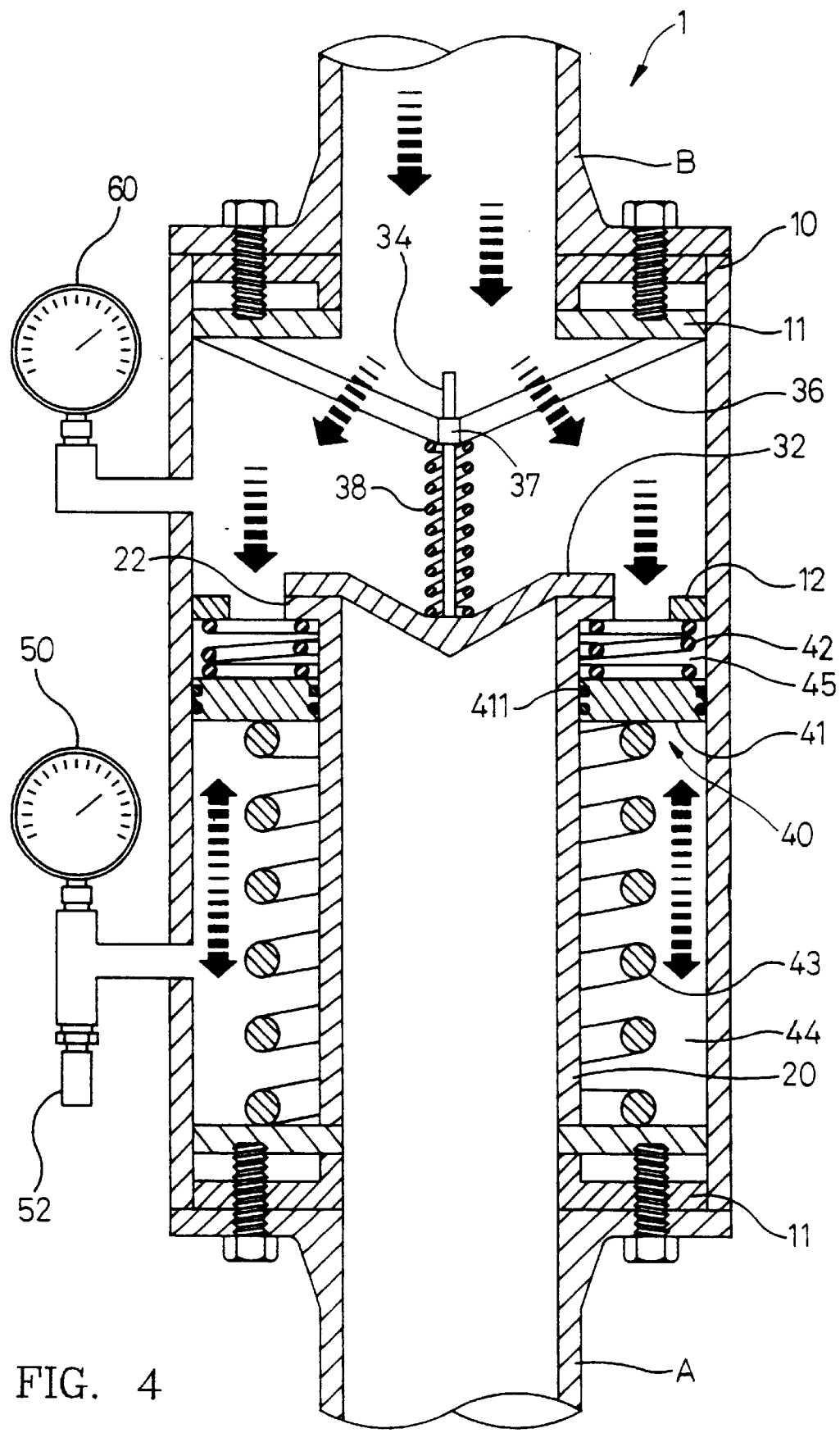
FIG. 4 is another sectional view similar to FIG. 2 in use state (for counterflow condition).

FIG. 4 shows what happens in a counterflow situation. The pump is stopped. Water in the piping system above the top end "B" counterflows downward because of gravity and produces water hammering effect. The valve cap 32 is pushed downward and closes the top end of the inner tube 20. Since the valve cap 32 bears the water pressure and water hammering force, the pump at the other end of the piping system is free from direct impact of water pressure, and thus may be prevented from damage. Moreover the damping chamber 45 and the third spring 43 in the air chamber 44 also can absorb the downward water hammering force. The impact force, vibration and noise resulting from water hammering thus may be effectively diffused. The water and air pressure may be read from the pressure gauges 60 and 50. Air pressure in the air chamber 44 may be adjusted through the nozzle 52 to obtain the most desirable results. The following offers more explanation how it words.

The water pressure in a piping system of a high rise building usually increases about 1 kg/cm$^2$ for every ten meters of height. For a twenty stories building with three meters for each story, the pump at the basement for pumping water up to the top of the building needs to provide over six kg/cm$^2$ of pumping pressure. On the other hand, when the operating pump is abruptly stop, there will be an instantaneous impact force (i.e., water hammer) of equal amount (as the upward water pressure) applying to the pump end of the piping system. With the water pressure gauge 60 of this invention, the aforesaid pumping pressure may be accurately measured. Then the counterflow absorber 1 may be properly configured and tube to offset the water hammering effect. The air pressure gauge 50 indicates the maximum pressure of water hammering. Based on that reading, the piping system may be properly configured and structured in terms of pipe strength, counterflow valve, solenoid valve, etc. The pressure variation shown in the gauge 50 also indicates the effects of the counterflow absorber 1 in damping the pressure, absorbing vibration and reducing noise. When the air pressure in the air chamber 44 is too high (e.g., air pressure variation is below 20% when water hammering happens), the damping and noise reducing effect of the absorber becomes poor. The air pressure of the air chamber 44 should be reduced to remedy this deficiency. It can be done by discharging exceeded air out of the air chamber via the nozzle 52. On the other hand, when the air pressure is too low (e.g. air pressure variation is above 80% when water hammering happens), air pressure of the air chamber 44 may be increased to the desired level through pumping more compressed air into it via the nozzle 52.

Through aforesaid arrangement, this invention can optimize the function of absorbing water hammering force, and reducing the vibration and noise incurred. This invention may be adapted easily to a wide variety of piping systems. Comparing with a conventional counterflow absorber which cannot accurately calculate the needed specifications of the pump, piping and valve, this invention offers a precise flexible and effective solution.

Figure 5:
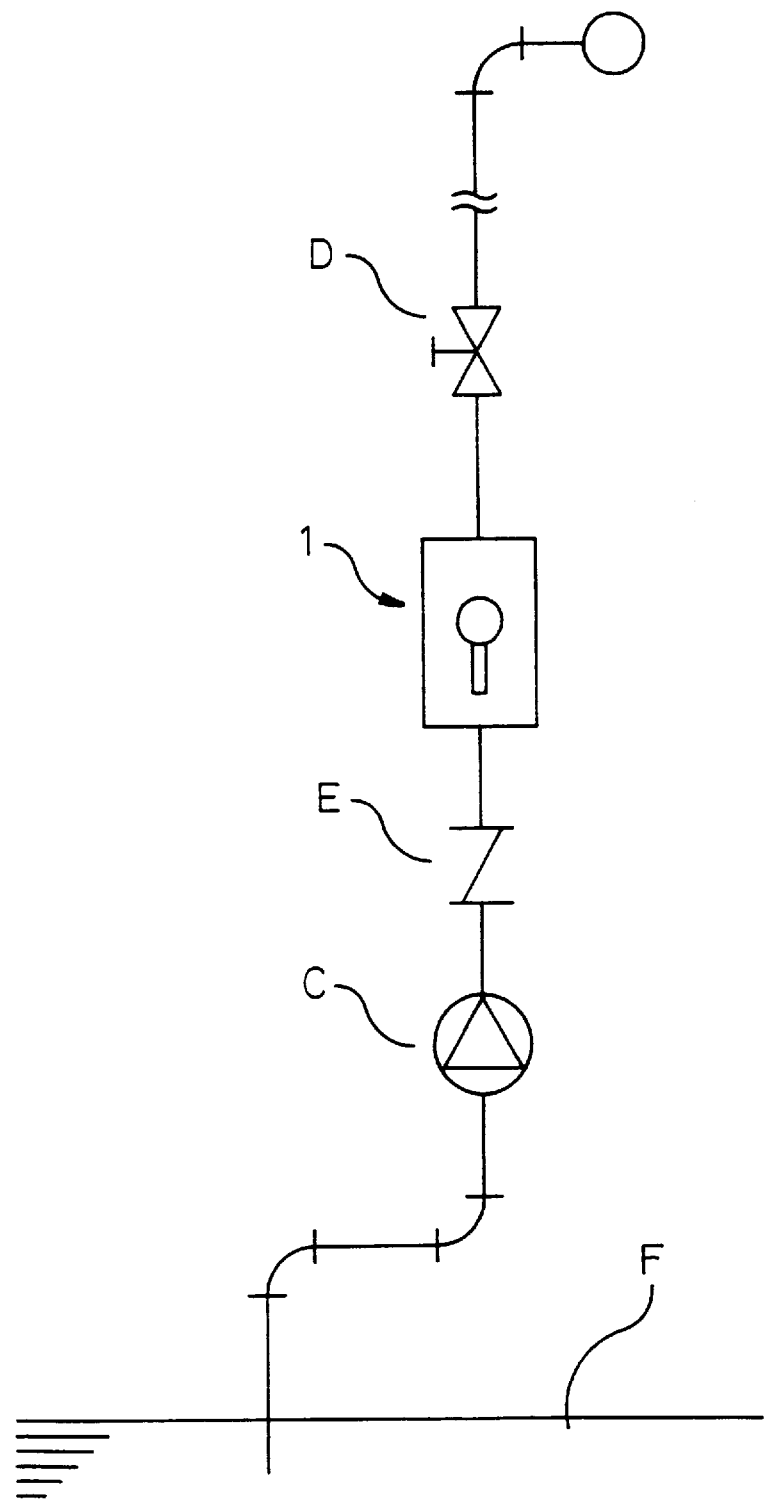
FIG. 5 schematically shows a first embodiment of this invention used in a piping system.

FIG. 5 shows a first embodiment of the possible applications of this invention. The piping system includes a pump C, a maintenance valve D, a spring type counterflow valve E. The counterflow absorber 1 of this invention is located between D and E. When the pump C is activated, water is pumped upward in regular flow from a water reservoir F. When counterflow happens, it stops at the absorber 1. Therefore water hammering force will not reach the pump C. It thus provides effective protection for the pump C.

Figure 6:
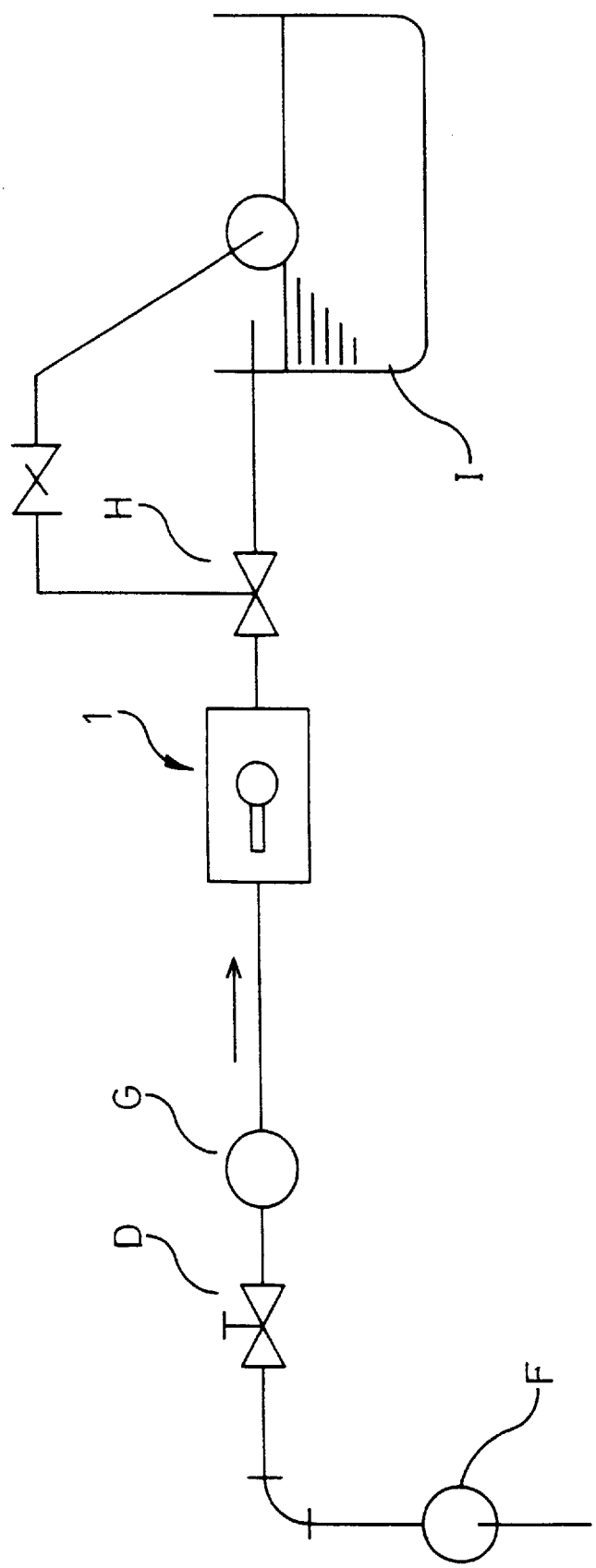
FIG. 6 schematically shows a second embodiment of this invention used in a piping system.

FIG. 6 illustrates a second embodiment of the possible applications. The piping system includes a counterflow absorber 1 of this invention located between a floating valve H and a water meter G, a maintenance valve D is located beyond G. Regular flow starts from a water source F up to a reservoir I. When water hammering happens, counter flow stops at the absorber 1. Thus the water meter G and the pump at the water source will be guarded from possible damage.

Figure 7:
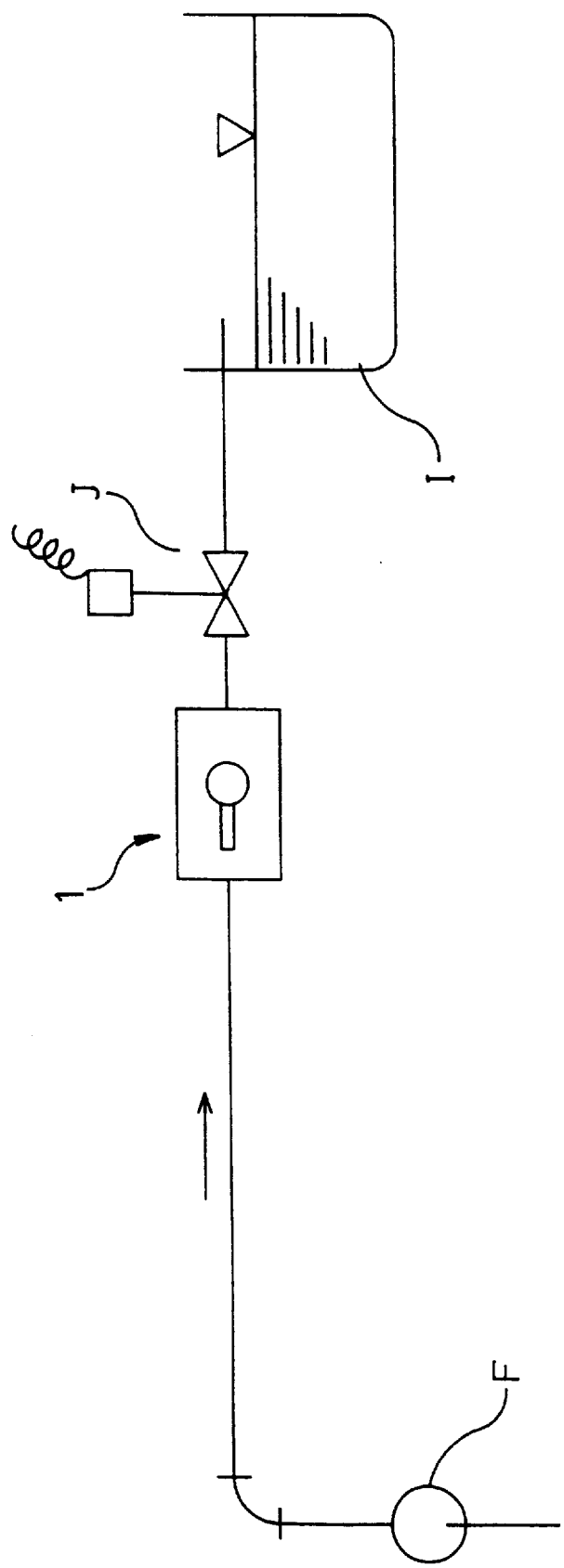
FIG. 7 schematically shows a third embodiment of this invention used in a piping system.

FIG. 7 shows a third embodiment of the possible applications. The piping system includes a counterflow absorber 1 of this invention located between a solenoid valve J and water source F. The regular flow is from water source F to a reservoir I. When water hammering happens, it stops at the absorber 1. Therefore the pump at the water source F can be protected from damage.

Besides above embodiments, in case a piping system has very long pipes, more than one absorber of this invention may be disposed at different suitable locations to provide the protection needed. As this invention is pressure adjustable, it can easily be adapted to different piping systems, regardless of the size or length of the pipes.

In summary, this invention offers effective force absorbing, and vibration and noise reducing function for a wide variety of piping systems. It can be directly installed in the piping system without taking extra space like a conventional absorber. And it can be configured and installed easily and flexibly.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. An I-type counterflow absorber connecting directly with a piping system for absorbing impact force and noise resulting from water hammering effect, said counterflow absorber comprising:

an outer tube having a connecting member at each of two ends thereof for connecting with the piping system, each connecting member having a plurality of screw openings formed therein;

an inner tube located within the outer tube to form a water passage;

a valve means located in the outer tube including a movable valve cap, said valve means also including a valve stem being connected to said valve cap and movable through a sleeve, a bracket holding the sleeve at one end and fixed on the other end thereof to the outer tube, and a first spring surrounding the valve stem for providing a force pushing the valve cap to cover one end of the inner tube; and a buffer means located between the inner tube and the outer tube including a damping chamber and an air chamber with an annular and movable piston ring located therebetween, the damping chamber fluidly communicating with the water passage, the air chamber being a closed enclosure filled with air.

2. An I-type counterflow absorber of claim 1, wherein the damping chamber has a second spring disposed therein, one end of the second spring pressing against a first flange formed at one end of the inner tube and a second flange formed around an inside wall of the outer tube while another end of the second spring pressing against one side of the piston ring.

3. An I-type counterflow absorber of claim 1, wherein the air chamber has a third spring disposed therein.

4. An I-type counterflow absorber of claim 1 further having a water pressure gauge attached to the outer tube from outside for measuring water pressure in the water passage and an air pressure gauge attached to the air chamber from outside for measuring air pressure therein, the air pressure gauge having a nozzle at one end thereof for discharging or pumping air in the air chamber for adjusting impact force absorbing capacity resulting from water hammering in the piping system.

5. An I-type counterflow absorber of claim 1, wherein the piston ring has O-ring on both rims for sealing the contact surfaces with the inner tube and outer tube.

* * * * *